Feb. 23, 1954

J. R. CLARK ET AL 2,670,156

CATAPULT HOOK MECHANISM

Filed Nov. 2, 1951

INVENTORS
JOHN R. CLARK
JOHN W. COURSEN
CARMINE G. JORDAN
BY
Walter S. Paul
ATTORNEYS

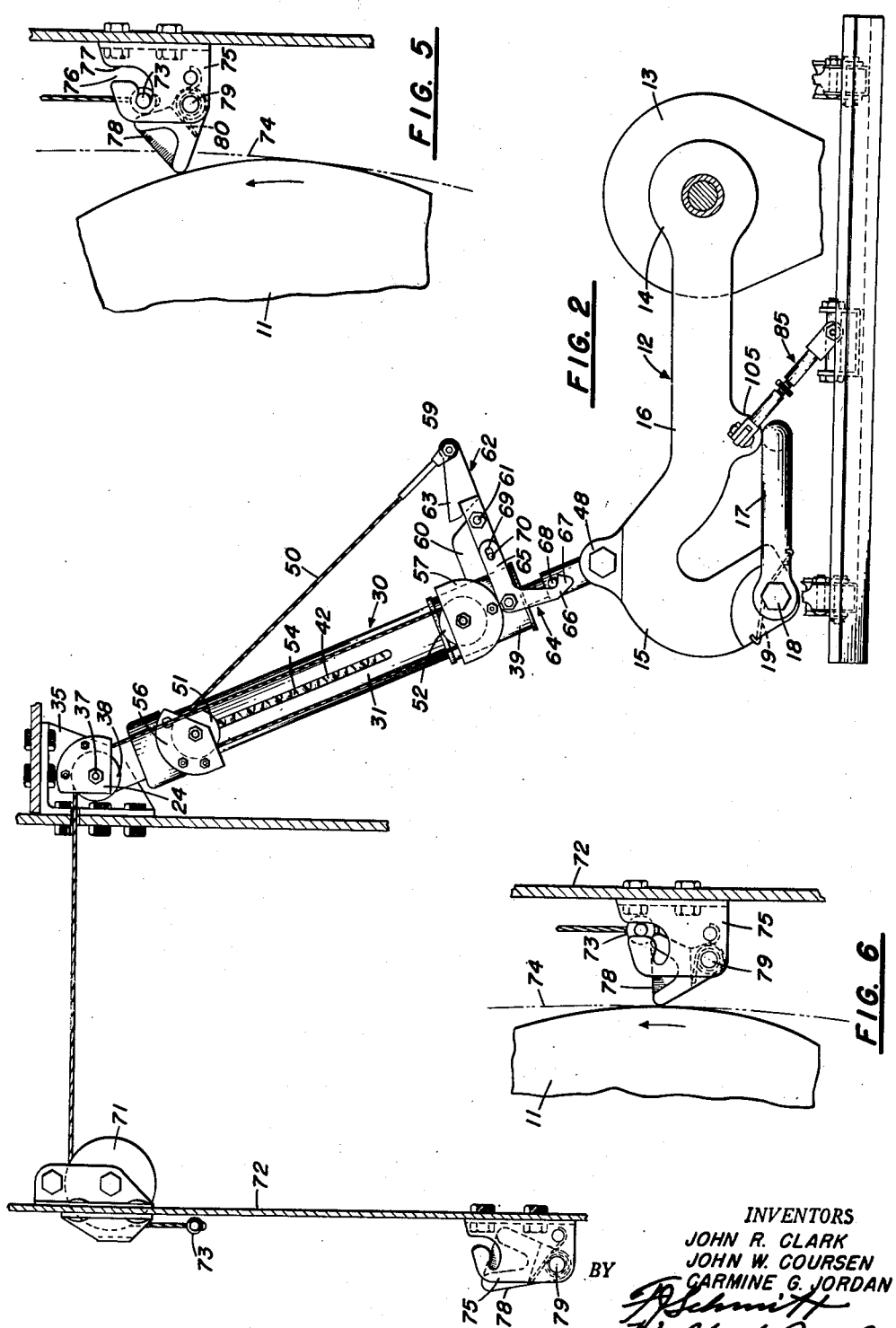

Feb. 23, 1954    J. R. CLARK ET AL    2,670,156
CATAPULT HOOK MECHANISM
Filed Nov. 2, 1951    3 Sheets-Sheet 3
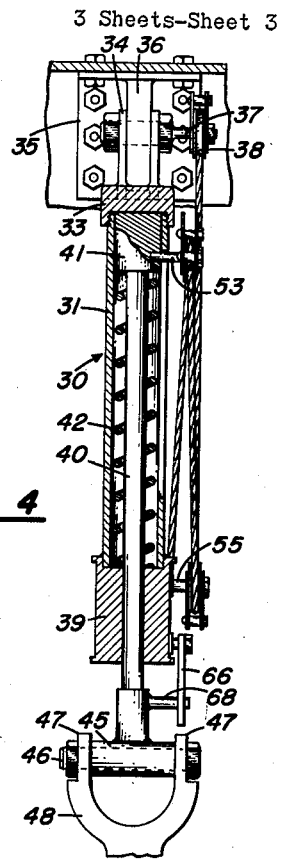
FIG. 4
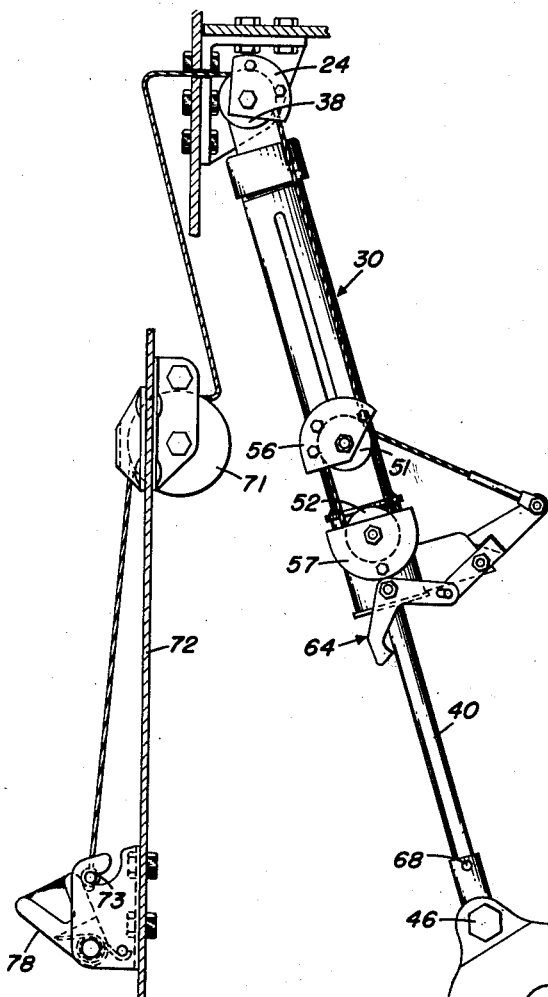
FIG. 3
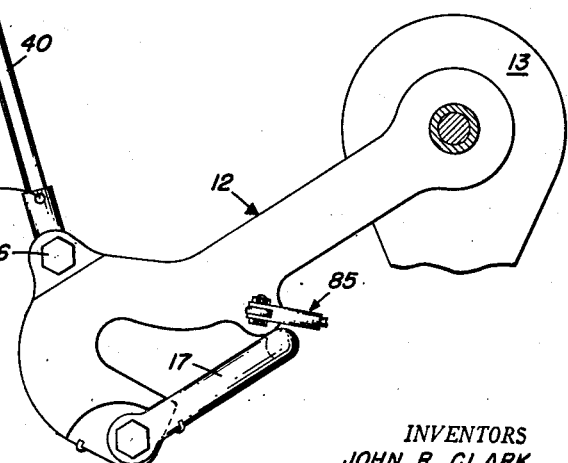
INVENTORS
JOHN R. CLARK
JOHN W. COURSEN
CARMINE G. JORDAN
BY
ATTORNEYS Patented Feb. 23, 1954

2,670,156

UNITED STATES PATENT OFFICE 2,670,156

CATAPULT HOOK MECHANISM

John R. Clark, Dallas, Tex., John W. Coursen, Merrick, N. Y., and Carmine G. Jordan, New Haven, Conn., assignors, by mesne assignments, to the United States of America as represented by the Secretary of the Navy Application November 2, 1951, Serial No. 254,552

10 Claims. (Cl. 244—63)

This invention relates to catapult launching mechanism for aircraft and more particularly to apparatus for retracting the catapult hook and doors on retraction of the nose landing wheel, after the aircraft is airborne.

Catapult hook mechanism has been employed heretofore which moves automatically into the airplane fuselage on release of pressure on the hook. This pressure release usually is due to the power drive of the airplane moving mechanism; but under certain conditions such as momentary power failure or variation in the belt line power transmission, the hook may be released and retracts prior to effectuation of the catapult action.

Also, heretofore, different power connections have been utilized to retract the catapult hook and to operate the doors which close the hook openings in the fuselage skin.

It is an important object of the invention to provide a retractible catapult hook for airplanes which is retracted only after the plane is airborne.

An object also is to provide single mechanism for initiating retractive movement of both catapult hook and hook doors.

An additional object is to provide catapult hook mechanism which may be manually set for catapult action at a point remote from the hook itself.

Still another object is to provide a catapult hook which is dependent for retraction wholly on airplane mechanism for initiating retractive action.

An additional object includes provision of mechanism dependent on landing gear, for catapult retraction.

Other objects and features of the invention will appear on consideration of the following detailed description taken in conjunction with the accompanying drawing in which:

Fig. 2 is a side elevational view of the hook-cable-latch mechanism with the hook retracted and the doors closed;

Fig. 3 is a side elevational view of the hook-cable-latch mechanism with the hook in extended position for engagement with the power device, the doors being open;

Fig. 4 is a sectional view of the hook strut showing the strut rod and spring, the strut being rotated 90° from the position of Fig. 3;

Fig. 5 is a detail view showing the hook operating cable end latched prior to being tripped by the nose wheel;

Fig. 6 is a detail similar to Fig. 5 but showing the cable end being released;

Figure 1:
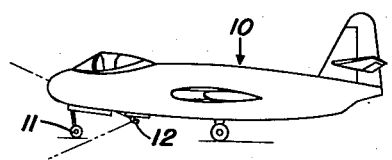
Fig. 1 is a side elevation of an airplane illustrating the positional relationship of the catapult hook and nose wheel of the landing gear.

As previously mentioned, the apparatus to be described has special usefulness in the launching of aircraft such as the airplane 10 of Fig. 1, this figure showing the usual retractable wheel landing gear, the nose wheel 11 and the retractible catapult hook 12.

Referring to Fig. 2, the hook 12 is pivoted on airplane frame member 13 and consists of the pivot member 14, hook section 15 and the divided connecting shank 16. (See Fig. 8.) On the hook tip a holding ring 17 is pivotally secured by bolt 18, coil spring 19 serving to hold the outer ring section normally against the projecting tab formed on the outer edges of the shank 16. This ring serves to hold the power cable or rod in place.

The strut 30 is formed of an enclosing tubular shell 31 (Fig. 4) having an end cap 33 threadedly engaging the outer side of the tube end, and apertured hinge plates 34 welded or otherwise attached to the end cap. A bracket 35 having a raised flange 36 serving as a pivot member for the strut, is fixed to the airplane frame. The pivot pin 37 is extended at one end to mount a cable pulley or sheave 38 over which a guard casing 24 in quadrant form is fixed.

The outer end of strut tube 31 is closed by an end block 39 to which it is attached. Positioned within the cylinder for slidable movement is a rod 40, the pivot end thereof being supported by insertion in a slide block 41 movable in the tube. The other end of the rod passes out of the tube casing through a slide opening in end block 39. A coil spring 42 normally maintains the slide rod 41 and rod 40 at the pivot end of the strut.

The strut rod 40 at its outer exposed end is fixed to a sleeve 45. This sleeve contains a pivot pin 46 to which the apertured ears 47 of a yoke 48, integral with the heel of the catapult hook section 15, are joined. Thus, it may be seen that coincident with pivotal hook movement, the strut rod 40 moves axially in strut tube 31 in coaction with coil spring 42.

A cable 50 is employed to move the hook to operative engagement position below the plane fuselage base. To this end, in addition to sheave 38 at the pivot end of strut 30, use is made of two additional strut sheaves, 51 and 52. Sheave 51 is rotatably mounted on a pin 53, mounted on the tube slide block 41 and slidable therewith through formation of an axially extending slot 54 for the pin in the tube 31. Sheave 52 is rotatably mounted on pin 55, inserted fixedly in the end block 39. Guard casings 56 and 57 are provided for sheaves 51 and 52, respectively.

Extending from strut end block 39 is a support plate 60 apertured adjacent its outer edge to receive pin 61 on which lever 62 is pivotally mounted. The outer end of this lever is provided with an opening and pivot pin 59 for attachment of the cable end, and also with a projecting stop 63 adapted to engage the edge of fixed support plate 60 when tension is applied to the cable.

A bell crank 64, having right angled arms 65 and 66, is pivotally mounted on end block 39 so as to be substantially coplanar with lever 62 in its plane of movement. Arm 66 terminates in a flat hook or latch 67 adapted to engage and hold pin 68 fixed on end of strut rod 40; and arm 65 terminates in a slot 69 adapted to receive a pin 70 fixed to the inner end of lever 62.

Cable 50 is secured to pivot pin 59 at one end and is threaded over sheaves 51, 52 and 38 in the hook strut assembly and thence passes to a fourth sheave 71 mounted on a frame support 72 in proximity to the nose landing wheel supports. The cable in the non-operative position of the hook terminates a short distance beyond sheave 71, in a rigid cross bar 73 serving to prevent movement of the cable end through sheave 71 and to provide a trip element for the cable release when the hook is extended.

The automatic nose wheel actuated trip mechanism for the cable-hook system is illustrated in Figs. 2, 5 and 6. The nose wheel 11 is indicated in Fig. 5 in the process of retraction, moving in the direction of the arrow, the broken line 74 lying on the arc of curvature of the outer wheel segment. Vertically bracketed to a frame support adjacent the outer line of wheel movement is a U-plate 75 having L-shaped slots 76 therein on the upper plate edges, one arm 77 of the slots being vertical and the other, 78, approximately horizontal with a slight reverse curvature on the upper edge, such as to retain the cross bar 73 of the tensioned cable when inserted therein. The trip lever 78 is triangular in shape, being pivotally attached to the pivot pin 79 on the plate 75 adjacent one apex thereof, and movable from the outer position of Fig. 5 intersecting wheel line 74 to the tripped position of Fig. 6. A coil spring 80 normally retains the trip lever in the position of Fig. 2.

In order to protect the plane interior from weathering and to maintain necessary continuity on the fuselage surface of the airplane, doors 81, 82 (Figs. 7, 8 and 9) are provided to afford a complete closure of the fuselage opening. This opening is preferably rectangular in shape with parallel sides, and on frame members 183 and 184 positioned adjacent and within the opening sides the door units are suspended. The doors are identical in construction except for allochiral reversals to secure proper coaction therebetween, and hence description is limited to one door 81.

Door 81 includes an elongated panel 83, curved transversely to conform to the fuselage curvature, hinge mechanism 84 for suspending and guiding movement of the panel to open and close positions, and a connecting unit 85 between the panel and hook 12 for actuating the door in conformity to hook movement.

The hinge mechanism 84 includes two L-shaped strips 86 and 87 pivotally connected at their vertices 20 and two support-slide angle plates 88 and 89, plate 88 being vertically attached to frame member 183 and plate 89 to the inside door surface. The angled sections are effectively coplanar and provided with an attachment aperture at one end and a slot extending from a point adjacent the aperture to a point short of the other end, numerals 90 and 91 in plate 88, and 92 and 93 in plate 89, designating the aperture and slot respectively. The angle strips 86 and 87 are connected to these angle plates, one end of strip 86 being connected to aperture 92 in plate 89 and to pin 94 in slot 91, and one end of strip 87 being pivotally connected to plate 88 at aperture 90 at one end and at the other end to slide pin 95 in the slot 93 of plate 89. With this arrangement it is apparent that the door panel is supported by the angle strip connection 90—20—92 subject to the slide connections 91—94 and 93—95, the angularity and length of slots 91 and 93 being such as insure complete and rapid opening on hook emergence and complete closure on hook retraction. Yieldable stop cables 21 are attached to each door edge to insure approximate sealing at the panel junctions at closure.

Power for actuating the door panels is transmitted by the connection unit 85 hereinabove referred to. This unit includes a U-shaped bracket 96 having upstanding end plates 100—101 which support a bolt 102 on which a rotatable sleeve 103 is rotatably mounted. Pivotally attached to this sleeve is a rod 104 the other end of which is pivotally connected to a projecting hook-tab 105 by means of pin and clevis connections 106, 107. As brought out in Fig. 8, the lower shank edge of the hook is bifurcated so as to give substantial spread to tabs 105 and permit attachment of brackets 100 clear of the door edge. As indicated in Figs. 7 and 8 the connecting rod 104 is made adjustable, as by the screw-sleeve structure shown.

Figure 7:
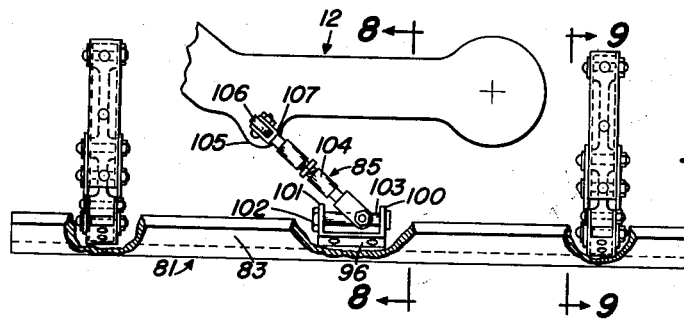
Fig. 7 is a view showing the connection between the doors and the hook shank.
Figure 9:
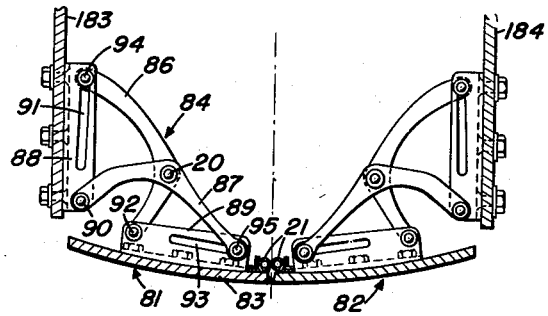
Fig. 9 is a view taken along lines 9—9 of Fig. 7, showing the door pivot arrangements.
Figure 8:
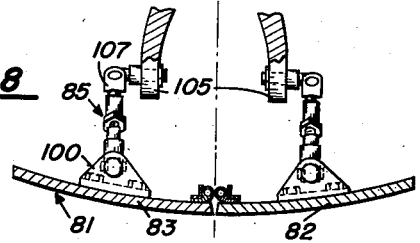
Fig. 8 is a view taken along lines 8—8 of Fig. 7, showing connections from the hook to the separate door panels.

As regards the door action, when the hook is in the retracted position of Fig. 7 the door panels are held in their closed position, as shown in Fig. 9. When the hook is released it pivots downwardly and connected rods 85 with their universal end connections move the door panels downwardly and outwardly. Thus the hook is projected below the fuselage and the door panels to permit engagement by the power cable of the catapult.

The operation of the hook mechanism as a whole may now be described.

In normal retracted position the hook 12 is within the fuselage with the hook 12 maintained in its retracted state by means of the coil spring 42 and hook 67. The door is closed by virtue of hook connectors 85.

To project the hook to operative position the attendant pulls cable bar 73 down and latches it in the slots 76. By so doing hook 67 is released, the strut rod 40 and hook 12 are forced outwardly against the tension of spring 42, and the latch release lever 78 is moved outwardly into the path of movement of nose wheel 11.

On retraction of the landing gear, nose wheel 11 releases the cable bar 73 and spring 42 retracts the hook and attached doors to inside position, where the hook 67 engages pin 68.

From the description it now appears that the hook 12 is released from pendant operative position only when the landing gear is retracted and hence inadvertent release of the hook due to power failure is avoided. In other words, the plane must be airborne before the hook can be retracted. Also it is evident that the hook itself need not be handled, the positioning thereof being dependent on the cable action which thus permits operative setting at a distance from the hook. Moreover, the door action is positive and directly dependent on the hook action.

It is apparent that the disclosure hereinabove described may be modified in many respects to meet specific needs and hence no limitation is implied by such description other than may be required by the claims hereto appended.

What is claimed is:

1. In catapult hook mechanism for aircraft and the like, a fuselage having a base opening therein, a catapult hook adapted to engage a traveling power mechanism, support means attached to said fuselage adjacent said opening for supporting said hook pivotally with the hook adapted to move inside and outside the fuselage of said aircraft, a resilient device attached to said fuselage and the free end of said hook for holding said hook in inside position, a power transmitting device mounted on said fuselage and connected to said resilient device for moving said hook to outside position against the tension of said resilient device, a trip device mounted on said fuselage and connectable to said power transmitting device for holding said hook in outside position, and automatic trip mechanism mounted on said fuselage and adjustable for coaction with said trip device for actuating said trip device to retract said hook only after said aircraft has become airborne.

2. The catapult hook mechanism for aircraft and the like, as defined in claim 1, said automatic trip mechanism including a retractible aircraft supporting wheel, and means operated by the retraction of said wheel for releasing said trip element, whereby said hook is moved within and enclosed by said fuselage.

3. The catapult hook mechanism for aircraft and the like as defined in claim 2, including additionally doors for closing the hook opening in said fuselage, and means connecting said hook and doors whereby on retraction of said wheel both the hook is retracted and the doors closed.

4. The catapult hook mechanism for aircraft and the like as defined in claim 1, said automatic trip mechanism being normally remote from and independent of said hook for releasing said trip element to retract said hook only after said aircraft is airborne.

5. In catapult hook mechanism for aircraft and the like, a fuselage having a base opening therein, a catapult hook pivotally attached at its base end to said fuselage for movement in and out of said opening, resilient two-ended extensible means including a first pivoted member, a second member slidable relative to said first member, and a spring for holding said second member normally in retracted position, said second member at its outer end having pivotal connection with the free end of said hook and said first member being attached at its pivoted end to a fixed support in said fuselage, a latch attached at the free end of said first member and adapted normally to engage the hook-end of said second member for holding said hook in retracted position within said fuselage, a cable mounted on said fuselage with an end thereof connected to said latch for release thereof, said cable being operable on manipulation to release said latch and to extend said second member outside the fuselage opening against the tension of said resilient means, a trip element on the free end of said cable, a trip device attached to said fuselage for receiving and holding said trip element against the tension of said resilient means to hold said hook in outside position, and automatic trip mechanism mounted on said fuselage for actuating said trip device to release said trip element and to retract said hook only after said aircraft has become airborne.

6. The catapult hook mechanism for aircraft and the like as defined in claim 5, said automatic trip mechanism including a retractible aircraft supporting wheel, and means operated by the retraction of said wheel for releasing said trip element whereby said hook is moved within and enclosed by said fuselage.

7. The catapult hook mechanism for aircraft and the like as defined in claim 6, including additionally doors for closing the hook opening in said fuselage, and means connecting said hook and doors whereby on retraction of said wheel both the hook is retracted and the doors closed.

8. A catapult hook mechanism for aircraft and the like as defined in claim 5, said automatic trip mechanism being normally remote from and independent of said hook for releasing said trip element to retract said hook only after said aircraft is airborne.

9. The catapult hook mechanism for aircraft and the like as defined in claim 5, the first member of said extensible means being tubular with an axially slotted wall, the second member of said extensible means having an expanded inner head and being slidable within said tubular first member, and said spring being coiled and positioned in the first member between the expanded head of said slidable second member and the free end of the pivoted first member, a first sheave mounted on said expanded second member head on a support extending through the slot in said first pivoted member wall to an external bearing, a second sheave attached to the free end of said first member, and a third sheave attached to the pivot end of said first member, said cable being threaded from said latch successively over said first, second and third sheaves.

10. In catapult hook mechanism for aircraft, a fuselage having an opening therein, a hook mounted on said fuselage and movable relative to said fuselage into and out of said opening, means connected to said hook and fuselage for actuating said hook between its retracted and extended position, a retractible aircraft supporting wheel, trip mechanism connected to said hook actuating means for holding said hook in extended position after manual setting, and release mechanism actuated by the retraction of said wheel only for releasing said trip mechanism to move said hook from extended to retracted position.

JOHN R. CLARK.
JOHN W. COURSEN.
CARMINE G. JORDAN.

References Cited in the file of this patent
UNITED STATES PATENTS

| Number | Name | Date |
|---|---|---|
| 1,893,591 | Minshall | Jan. 10, 1933 |
| 2,145,685 | Chilton | Jan. 31, 1939 |
| 2,406,710 | Riggles | Aug. 27, 1946 |
| 2,481,454 | Steele et al. | Sept. 6, 1949 |
| 2,505,652 | Schweitzer et al. | Apr. 25, 1950 |
| 2,548,832 | Tydon | Apr. 10, 1951 |
| 2,570,534 | Erny | Oct. 9, 1951 |

FOREIGN PATENTS

| Number | Country | Date |
|---|---|---|
| 568,365 | Great Britain | Mar. 30, 1945 |